No. 743,043. PATENTED NOV. 3, 1903.
G. W. SOUTHWICK.
VEHICLE TIRE.
APPLICATION FILED AUG. 29, 1902.
NO MODEL.
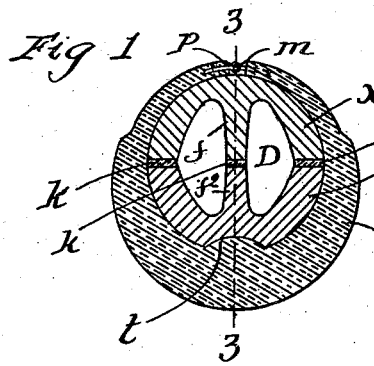
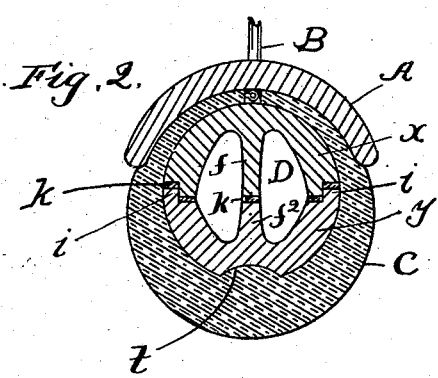
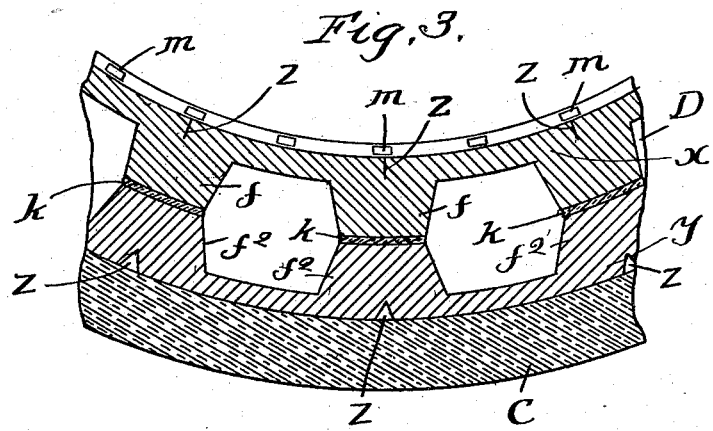
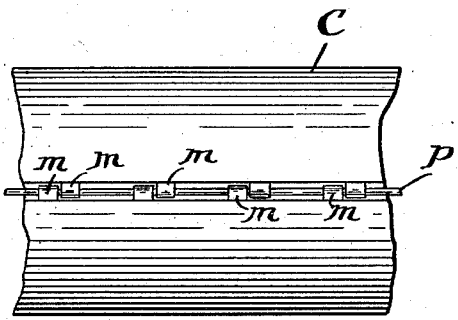
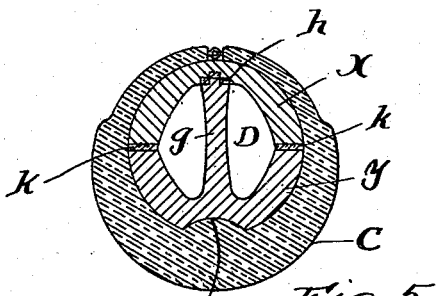
Witnesses:
H. B. Davis.
Jno. J. Davis.
Inventor:
George W. Southwick,
By O. M. Shaw.
Atty.

No. 743,043. Patented November 3, 1903.

UNITED STATES PATENT OFFICE.

GEORGE W. SOUTHWICK, OF FRANKLIN, MASSACHUSETTS.

VEHICLE-TIRE.

SPECIFICATION forming part of Letters Patent No. 743,043, dated November 3, 1903.

Application filed August 29, 1902. Serial No. 121,461. (No model.)

*To all whom it may concern:*

Be it known that I, GEORGE W. SOUTHWICK, of Franklin, in the county of Norfolk and State of Massachusetts, have made certain new and useful Improvements in Vehicle-Tires, of which the following is a description sufficiently full, clear, and exact to enable any person skilled in the art or science to which said invention appertains to make and use the same, reference being had to the accompanying drawings, forming a part of this specification, in which—

Figure 1 is a cross-section of my improved tire; Fig. 2, a like view showing a modification and the tire mounted on the wheel-felly; Fig. 3, a longitudinal section on line 3 3 in Fig. 1; Fig. 4, a top plan view showing the cover-lacing, and Fig. 5 a cross-section illustrating a modification in the inner tube.

Like letters of reference indicate corresponding parts in the different figures of the drawings.

My invention relates especially to an improvement in rubber-covered tires, particularly designed for use on automobiles or heavy electrically-propelled vehicles, wherein it is essential that the tires should have the required resiliency and yet be light, strong, and particularly tough in resisting lateral strain or stress. On automobiles and similar carriages much difficulty has been experienced and much cost engendered from the rapid wearing out or tearing of the rubber tires. In fact, it has been found in practice that pneumatic tires are substantially impracticable for this use and that a solid rubber tire is not only too heavy, but tears in the tread and frequently accidentally detaches from the rim or felly, rendering accidents liable when the vehicle is moving at high speed. My invention overcomes these and other objections, and while in some features similar to the device shown in my United States Patent No. 678,055, dated July 9, 1901, so improves that device as to render it applicable for use with this class of vehicles.

The nature and operation of the improvements will be understood from the following explanation.

In the drawings, A represents the wheel-felly, B the spoke, and C the rubber outer casing of the tire, which is provided in the usual manner with a thickened tread.

D represents the core of the tire. This comprises, primarily, a hoop of wood formed of a tube split longitudinally into two members $x\ y$. The bending of these members into the ring or circle is accomplished by steaming or what is known as "sweating" the material, aided by V-shaped kerfs $z$, cut laterally in their outer surfaces. The ends of the tube or ring thus formed are overlapped or left free to slip in a band or thimble of most ordinary construction to allow for sufficient play to spring the tire onto the felly A, which is of the usual grooved construction. The outer face of the outer member $y$ I groove longitudinally at $t$ in order that the material of the casing C may project therein and guard against lateral movement independent of said core D; but this is not essential, as after the tire is mounted it is impossible to turn it laterally, the greater circumference being on the outside.

Interiorly of each member $x\ y$ I form an integral projection $f f^2$. These projections in the completed core register, as shown in Fig. 3, and form trusses, whereby the heart of the tire is greatly strengthened without materially increasing the weight, or instead of each member having a projection a single lip, as $g$ in Fig. 5, may be formed on a member and tongued into the companion, as at $h$. In fact, any method of providing a truss or support between the two tube members may be employed without departing from the spirit of my invention. This tongue, moreover, will effectually prevent lateral movement of said members. In Fig. 2 I show another method by overlapping or dovetailing the edges of said members together, as at $i$. Now between the edges of the members $x\ y$ and between the meeting edges of the truss projections $f f^2$ I incorporate a layer of rubber $k$. This I discover very materially increases the resilience of the completed tire and is salient in my invention.

The outer rubber casing C is composed of rubber and incorporated canvas thickened at the tread and thinner where it rests in the grooved felly. In these thinned edges I vulcanize eyes m, which will register when inclosing the hoop-core D and through which a lacing-wire p may readily be passed. It will be understood that any of the well-known methods of lacing the edges of this casing together may be employed—as, for example, hooks and eyes, flexible loops of metal, or other means.

When the parts are assembled as illustrated, as is well known to those skilled in the art, by means of the spreading levers in common use for the purpose, the diameter of the tire may be sufficiently and momentarily enlarged to enable the operator to spring it over the edge of the felly A, into the groove of which it will rebound. Then the ends of the lacing p may be fastened together.

I discover by experiment that a tire constructed on this principle has very great resilience, that it is practically as light as a pneumatic tire and much more effective in resisting wear necessarily met in heavy vehicles, that it is impervious to puncture, or at least any damage caused thereby, that the hoop-core, with the elastic material between its members, adds to the resiliency by its own spring, makes the tire very rigid in resisting lateral strain, particularly when corners or irregular courses are attempted at high speed, and that the outer casing C wears far longer than does even the surface of an ordinary "solid" rubber tire.

Of course it will be understood that I do not confine myself to constructing the core of wood, as other material might be employed, although I believe wood to be the most practical; nor do I confine myself to any particular method of securing the casing or the tire to the rim or felly, nor to any particular form of truss.

Having thus explained my invention, what I claim is—

1. A vehicle-tire comprising an elastic outer casing; a core comprising a hollow hoop formed of two members; trusses between said members; and elastic material between the meeting edges of said members; and devices for securing said casing around said core.

2. The herein-described tire comprising a wooden core formed in two members; trusses between said members; and the casing, C, having lacing-eyes at its meeting edges.

3. In a vehicle-tire, the combination of a core comprising two semitubular sections composed of substantially rigid material, and an outer casing of elastic material surrounding said core.

4. In a vehicle-tire, the combination of a core comprising two semitubular sections composed of substantially rigid material, said sections having interlocking joints, and an outer casing of elastic material surrounding said core.

5. In a vehicle-tire, the combination of a core comprising two semitubular sections composed of substantially rigid material, both of said sections having internal registering projections forming trusses, and an outer casing of elastic material surrounding said core.

6. In a vehicle-tire, the combination of a core comprising two semitubular sections composed of substantially rigid material, said sections having an elastic material between them, and an outer casing of elastic material surrounding said core.

7. In a vehicle-tire, the combination of a core comprising two semitubular sections composed of substantially rigid material, said sections having interlocking joints and an elastic material between them, and an outer casing of elastic material surrounding said core.

8. In a vehicle-tire, the combination of a core comprising two semitubular sections composed of substantially rigid material, both of said sections having internal registering projections forming trusses and having elastic material between them, and an outer casing of elastic material surrounding said core.

GEORGE W. SOUTHWICK.

Witnesses:
O. M. SHAW,
JNO. J. DAVIS.